United States Patent [19]

Imaizumi et al.

[11] Patent Number: 4,538,933

[45] Date of Patent: Sep. 3, 1985

[54] PAPER FEEDING APPARATUS IN A PRINTER

[75] Inventors: Mamoru Imaizumi; Takashi Fujiwara, both of Nagoya, Japan

[73] Assignee: Brother Kogyo Kabushiki Kaisha, Aichi, Japan

[21] Appl. No.: 529,697

[22] Filed: Sep. 2, 1983

[30] Foreign Application Priority Data

Sep. 10, 1982 [JP] Japan .............................. 57-158286

[51] Int. Cl.[3] .......................... B41J 19/92; H02D 5/16

[52] U.S. Cl. ................................ 400/582; 400/583.4; 364/518

[58] Field of Search ...................... 400/582, 583.4, 583, 400/583.1, 583.2, 583.3; 364/518, 521, 523; 382/16, 57

[56] References Cited

U.S. PATENT DOCUMENTS

| | | | |
|---|---|---|---|
| 4,037,705 | 7/1977 | Martin et al. | 400/582 X |
| 4,066,941 | 1/1978 | Foster | 400/583.4 X |
| 4,225,251 | 9/1980 | Klimek et al. | 400/582 X |
| 4,349,770 | 9/1982 | Ragen | 400/582 X |
| 4,396,307 | 8/1983 | Shah et al. | 400/582 X |

FOREIGN PATENT DOCUMENTS

| | | | |
|---|---|---|---|
| 0019694 | 12/1980 | European Pat. Off. | 400/582 |
| 0114584 | 9/1980 | Japan | 400/582 |
| 0031785 | 2/1983 | Japan | 400/582 |
| 2071941 | 9/1981 | United Kingdom | 400/320 |

OTHER PUBLICATIONS

Semi-Automatic Paper-Insertion Apparatus, K. Hagiwara, IBM-TDB, vol. 25, No. 11A, Apr. 1983, pp. 5801-5802.

*Primary Examiner*—Edgar S. Burr
*Assistant Examiner*—James R. McDaniel
*Attorney, Agent, or Firm*—Browdy and Neimark

[57] ABSTRACT

A paper feeding apparatus in a printer, wherein a sheet of paper placed on a rotary support member is fed by a predetermined distance through a corresponding angle of rotation of a drive motor which is energized by a drive circuit under control of a control device which applies a control signal to the drive circuit to give a predetermined angle of rotation to the drive motor and thereby effect a paper feeding cycle each time the control signal is applied. The control device includes control means for adapting the control signal so as to progressively increase the operating speed of the drive motor up to a predetermined level when the application of the control signal takes place more than a predetermined time interval after termination of the previous paper feeding cycle. When the application of the control signal takes place within the predetermined time interval, the control means adapts the control signal so as to cause the drive motor to operate at a constant speed equal to the predetermined level throughout the predetermined angle of rotation thereof.

5 Claims, 4 Drawing Figures

FIG. 1
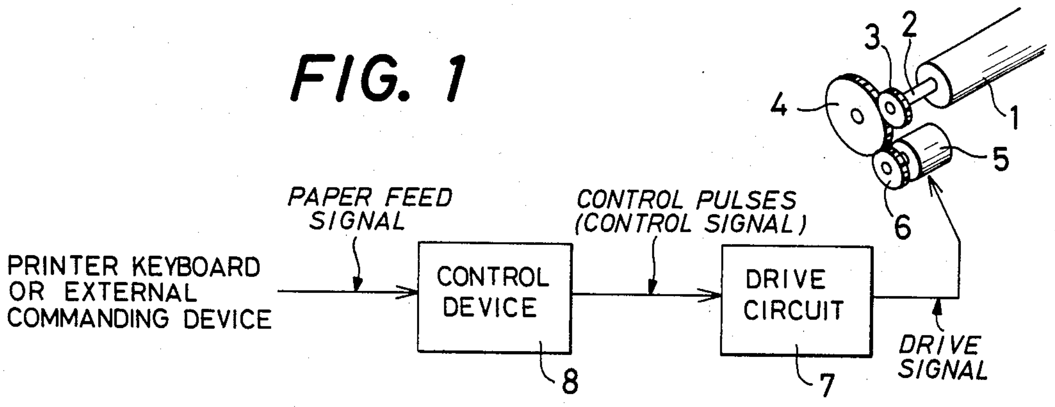
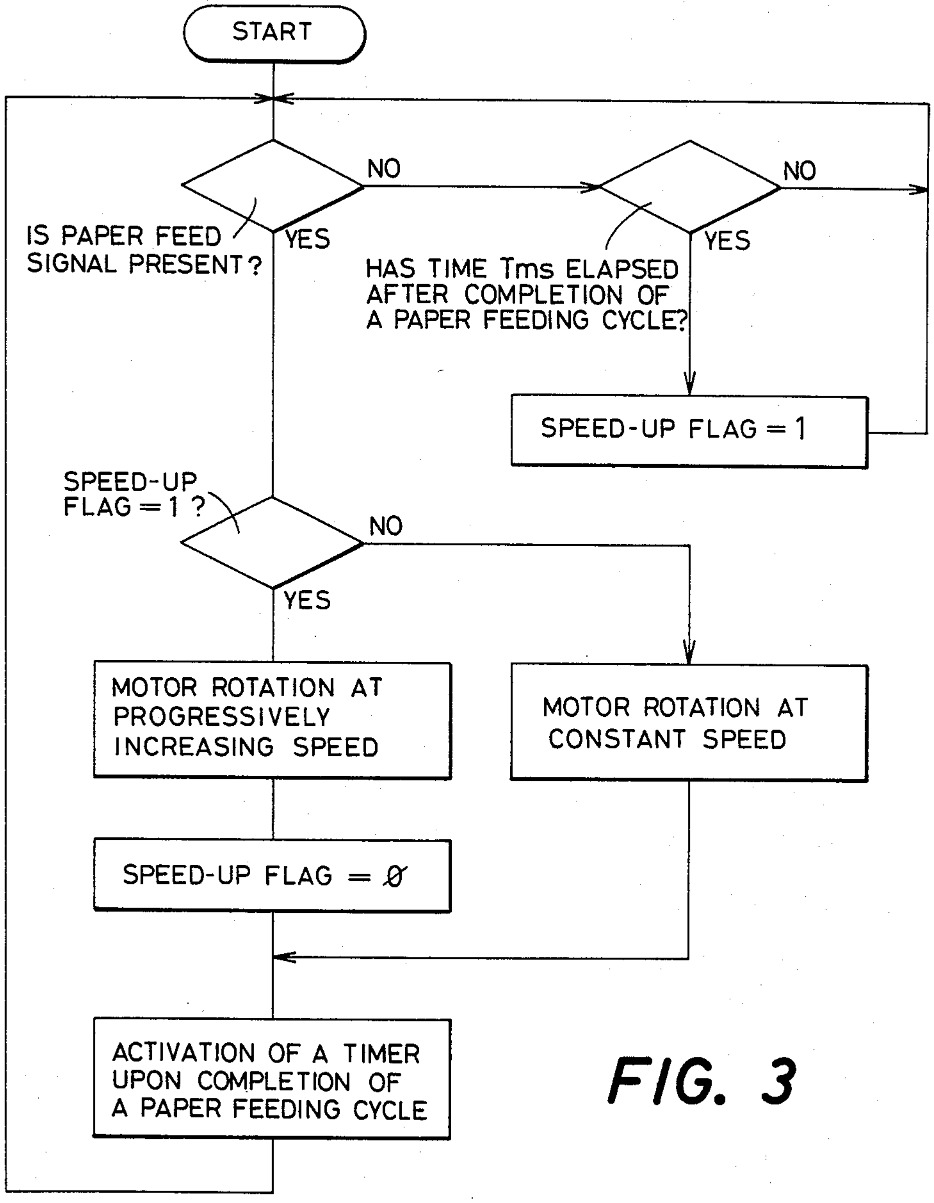
FIG. 3

PAPER FEEDING APPARATUS IN A PRINTER

BACKGROUND OF THE INVENTION

The present invention relates to a paper feeding apparatus for use in a printer.

In the art of a paper feeding apparatus in a printer, it is known that a sheet of paper is fed by a desired distance, i.e., a desired number of lines through activation of a drive motor energized by a drive circuit which receives a control signal from a control device. This control device applies the control signal to the drive circuit each time the control device receives a paper feed or line feed signal from a keyboard of the printer or an external commanding device. It is also known that such control signal applied to the drive circuit to give a predetermined angle of rotation to the drive motor is adapted to progressively increase the operating speed of the drive motor or gradually accelerate the drive motor up to a predetermined level during rotation thereof to feed or advance the sheet by one line-spacing distance. Thus, when a plurality of paper feed signals are successively applied to the control device to advance the sheet a distance a plural line-spacings, the drive motor is subject to such progressive acceleration each time the paper feed signal and consequently the control signal are generated, that is, upon each predetermined angle of rotation thereof. In this arrangement of the prior paper feeding apparatus, the rotating speed of the drive motor is varied periodically during a continuous rotation of the motor triggered by successive paper feed signals. The variation in the operating speed creates vibrations and noises in the paper feeding mechanism and associated parts of the printer. Thus, the paper feeding apparatus known in the art suffers from the problems of vibrations and noises as discussed above.

SUMMARY OF THE INVENTION

It is accordingly an object of the present invention to provide a paper feeding apparatus for use in a printer, which is free from the above indicated problems of vibrations and noises caused by periodic variation in operating speed of a paper feeding motor when the motor is operated continuously under the command of successive control signals.

According to the present invention, there is provided a paper feeding apparatus in a printer, which comprises: a paper support member for supporting a sheet of paper for impression of characters thereon along a line of printing; a drive mechanism operatively connected to the paper support member and including a drive motor for feeding the sheet of paper in a direction normal to the line of printing; a drive circuit for energizing the drive motor; and a control device operative to apply a control signal to the drive circuit to give a predetermined angle of rotation to the drive motor and thereby effect a paper feeding cycle of a predetermined distance upon each application of the control signal to the drive circuit. The control device includes control means for adapting the control signal so as to progressively increase the operating speed of the drive motor up to a predetermined level when the application of the control signal takes place more than a predetermined time interval after termination of the last paper feeding cycle. When the application of the control signal takes place within the predetermined time interval, however, the control means adapts the currently produced control signal so as to cause the drive motor to maintain the predetermined increased level of operating speed throughout the predetermined angle of rotation.

In one specific form of the invention, the paper feeding apparatus comprises a platen on which the sheet of paper is placed for impression of characters along a line of printing parallel to the platen, a drive mechanism operatively connected to the platen and including a stepper motor having a plurality of poles for feeding the sheet of paper in a direction normal to the line of printing, a drive circuit for energizing the stepper motor, and a control device responsive to a paper feed signal from a commanding device such as a keyboard of the printer or an external or remotely located operation board. The control device applies a group of control pulses to the drive circuit in response to the paper feed signal. These control pulses excite windings of the respective poles of the stepper motor and thereby effect a paper feeding cycle each time the paper feed signal is received by the control device. The control device includes control means for judging whether or not the paper feed signal is received within a predetermined time interval after termination of the last paper feeding cycle triggered by the previous paper feed signal. When the judgement by the control means reveals that the paper feed signal has been received after the predetermined time interval has lapsed, the control means operates to cause the control pulses to have a pulse spacing which progressively decreases down to a predetermined value. On the other hand, when the judgement reveals that the paper feed signal is received within the predetermined time interval defined above, the control means operates to adapt the control pulses to have a constant pulse spacing corresponding to said predetermined value.

In a paper feeding apparatus of the invention constructed as described above, a progressive increase in the operating speed of the drive motor occurs only when the control signal applied to the drive circuit is generated more than a predetermined time interval after termination of the last paper feeding cycle. In other words, the present feeding apparatus has means for preventing such progressive speed increase of the drive motor during a continuous operation which is triggered by successive paper feed signals for continuous sheet feeding by a distance of plural line spacings if each of those paper feed signals is generated within a predetermined period of time after the completion of the last paper feeding cycle.

BRIEF DESCRIPTION OF THE DRAWINGS

The above and other objects, features and advantages of the present invention will become more apparent from reading the following description of the preferred embodiment taken in connection with the accompanying drawings in which:

FIG. 1 is a view perspectively and diagrammatically illustrating a paper feeding apparatus embodying the present invention;

FIG. 3 is a flow diagram showing an operation of an exemplary control device used in the paper feeding apparatus of the invention.

DETAILED DESCRIPTION OF THE PREFERRED EMBODIMENT

Figure 2:
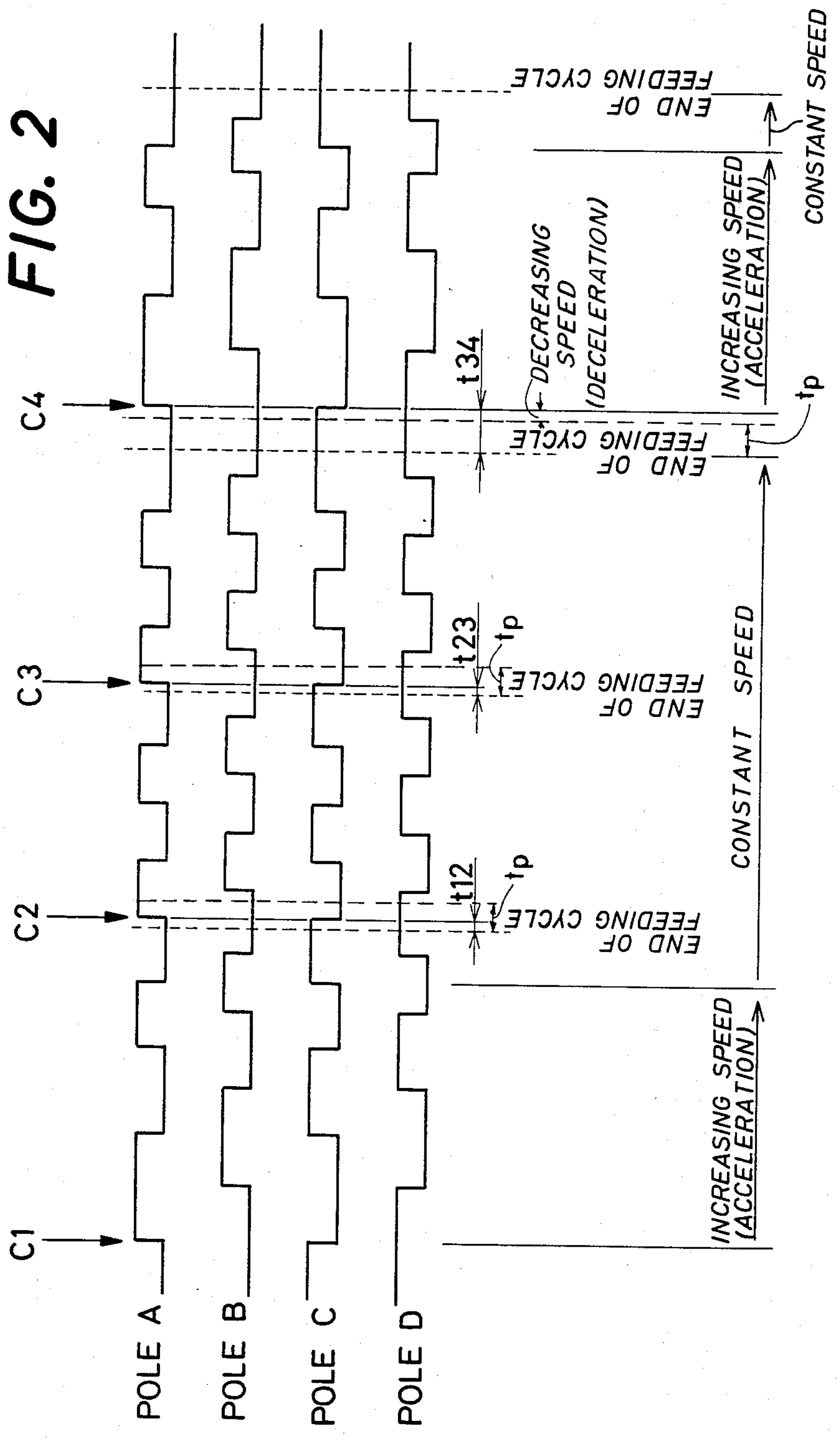
FIG. 2 is a diagrammatic timing chart showing control pulses for exciting pole windings of a stepper motor used in one form of the invention.
Figure 4:
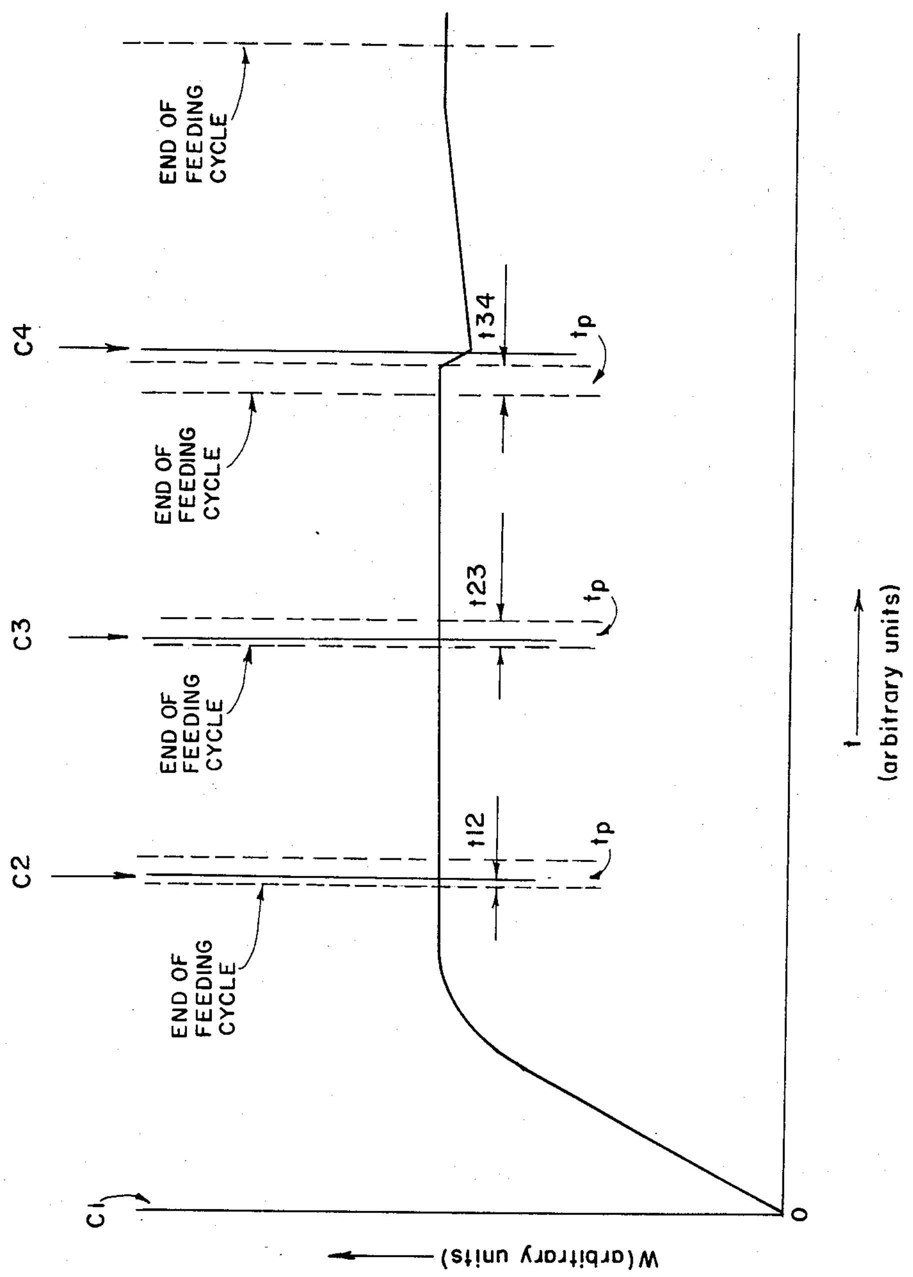
FIG. 4 is a plot of angular velocity($\omega$) vs. time (t).

Referring first to FIG. 1, there is shown a paper feeding apparatus in a printer wherein a platen 1 serving as a support member for supporting a sheet of paper (not shown) is rotatably supported on the printer through a shaft 2 such that the platen 2 extends parallel to a line of printing on the sheet of paper. To one end of the shaft 2 is fixed a small driven gear 3 which is operatively connected, through an idler gear 4, to a driving gear 6 fixed to a drive shaft of a stepper motor 5. The gears 3, 4 and 6, and the stepper motor 5 cooperate to constitute a drive mechanism for rotating the platen 1 to feed the paper sheet in a direction normal to the line of printing.

The stepper motor 5 used in this particular embobidment of the paper feeding apparatus has four poles (phases) the windings of which are excited or energized sequentially in selected pairs by drive signals from a drive circuit 7 as illustrated in a timing chart of FIG. 2. These drive signals are produced based on corresponding control pulses which are presented from a control device 8 when the control device 8 receives a paper feed or line feed signal from a keyboard of the printer or from an external or remotely located commanding device. More specifically stated, the control device 8 which comprises a micro-processor in this embodiment, produces a control signal, i.e., control pulses which represent a predetermined amount of operation or angle or rotation of the stepper motor 5 (in eight steps in this embodiment) and timings at which the different combinations of the exited pole windings of the stepper motor 5 are changed sequentially. Described in more detail referring to FIG. 2, windings of Pole C and D are energized while the stepper motor 5 is at rest. When a first paper feed signal C1 is applied to the control device 8 in this condition, the phase of the stepper motor 5 is changed in sequence from the initial C-D phase to D-A, A-B, B-C, C-D, and so on, so that the stepper motor 5 is operated in eight steps with sequential excitation of different combinations of two of the four pole windings. As a result, the motor is rotated by a predetermined angle corresponding to the eight steps to feed or advance the sheet of paper on the platen 1 by a predetermined distance in a direction normal to the line of printing. In this connection, it is noted that each set or group of control pulses are adapted so that the pulse spacing or pulse duration of the control pulses for Steps 1 through 6 are progressively reduced to a predetermined value but that of the control pulses for Steps 7 and 8 is kept constant at the predetermined value. In this arrangement, therefore, the operating or rotating speed of the stepper motor 5 is increased progressively or accelerated in steps in the initial period of rotation until Step 7 is initiated, and the motor 5 is operated at a constant speed during the remaining angle of rotation in Steps 7 and 8.

One paper feeding cycle associated with the first paper feed signal is completed by excitation of the last combination of the windings of poles C and D (C-D phase excitation) for a predetermined fraction of its duration of the last pulse width. Upon completion of the feeding cycle, a timer built in the control device 8 is started and the control device 8 judges whether or not a second paper feeding signal C2 has been received within a predetermined time interval $t_p$ after termination of the first paper feeding cycle. Stated differently, the control device 8 judges whether a length of time T12 between the end of the first feeding cycle triggered by the first paper feed signal C1 and the entry or rise of the second paper feed signal C2 is shorter than said predetermined time interval Tms. When the judgement reveals that the above length of time T12 is shorter than the time interval $T_p$, the control device 8 produces control pulses whose pulse spacing or pulse duration is constant, i.e., the control pulses are adapted so that the operating speed of the stepper motor 5 is kept constant at a predetermined normal operating level throughout its operation beginning with the first step of rotation. In this instance, the length of time T12 is short enough for maintenance of sufficient inertia to prevent significant deceleration of the platen 1 and other components in the drive mechanism, and as a result the operation of the stepper motor 5 at the predetermined operating speed from the very beginning of its rotation will not create a possibility of failure of the stepper motor 5 in responding to the drive signals. Similarly, the third paper feeding cycle triggered by a third paper feed signal C3 is conducted at the predetermined constant speed without a progressive speed increase or acceleration of the stepper motor 5 because a length of time T23 from the termination of the feeding cycle based on the second paper feed signal C2 to the receipt of the third paper feed signal C3 is shorter than the time interval Tms.

Contrary to the lengths of time T12 and T23, a length of time T34 between the termination of the third paper feeding cycle and the reception of a fourth paper feeding signal C4 is longer than the predetermined time interval $T_p$. In this instance, the fourth paper feeding cycle triggered by the signal C4 is carried out at a progressively increasing speed of the stepper motor 5 as in the first paper feeding cycle. This acceleration of the motor 5 from a low speed (after significant deceleration after the inertia of the drive mechanism has become insufficient for the drive mechanism to maintain a relatively constant speed) to the predetermined normal operating speed is intended to achieve a smmoth restarting of the drive mechanism whose platen 1 and other components have been almost stopped in the comparatively long length of time T34, and thereby prevents otherwise possible response failure of the motor 5 which could take place due to resistance or inertia of the drive mechanism if the motor 5 was commanded to start its rotation at the predetermined normal operating speed or to operate at a high constant speed from the very beginning of its rotation.

The events of operation discussed above are described below with reference to a flow diagram provided in FIG. 3, wherein upon aplication of a paper feed signal to the control device 8, a central processing unit in the control device 8 checks to see if a "speed-up" flag is present or not. In the event the "speed-up" flag is present (in the set state), the stepper motor 5 is controlled so that its operating speed is progressively increased. Upon completion of a paper feeding cycle with a predetermined angle of rotation of the stepper motor 5, the "speed up" flag is reset to zero and the timer is started. If a next paper feed signal is received by the control device 8 within the predetermined time interval $T_p$ of the timer, the "speed-up" flag remains in the reset (zero) state and therefore the stepper motor 5 is operated at the predetermined constant speed. When the timer times out, i.e., when the time interval Tms has elapsed, the "speed-up" flag is set. In consequence, a subsequent application of a paper feed signal will cause the associated paper feeding cycle to be effected at a progressively increasing speed of the stepper motor 5.

As depicted hereinbefore, a paper feeding apparatus according to the present invention is capable of operating a drive motor at a substantially constant speed without a progressive rise of its speed during a continuous paper feeding operation triggered by successive paper feed signals if each of those signals is presented within a predetermined, relatively short time interval after the termination of a paper feeding movement based on the preceding i.e., last paper feed signal. Thus, the continuous paper feeding movements are accomplished without otherwise possible periodic variation or fluctuation in operating speed of the drive mechanism, whereby it is possible to prevent development of noises and vibration of the printer and reduce an overall time of a paper feeding cycle which is triggered by each one of the successive paper feed signals.

Although the foregoing embodiment of the paper feeding apparatus employs a stepper motor as drive means for actuating the apparatus, it will be obvious to substitute a DC servomotor for the stepper motor. It is to be understood to those skilled in the art that other changes and modifications may be made in the invention within the scope of the following claims.

What is claimed is:

1. A paper feeding apparatus in a printer, comprising:

a paper support member for supporting a sheet of paper for impression of characters thereon along a line of printing;

a drive mechanism operatively connected to said paper support member and including a drive motor to operate said paper support member for feeding said sheet of paper in a direction normal to said line of printing, said driving motor having an operating speed which can vary between an accelerating mode and a constant speed mode;

a drive circuit for energizing said drive motor; and a control device operative to apply a control signal to said drive circuit to give a predetermined angle of rotation to said drive motor and thereby effect a paper feeding cycle of a predetermined distance upon each application of said control signal to said drive circuit, said control device including control means comprising a means for adapting said control signal to progressively increase the operating speed of said drive motor up to a predetermined level when the application of said control signal takes place more than a predetermined time interval after termination of the last paper feeding cycle, and said control means including a means for adapting said control signal to cause said drive motor to maintain said predetermined level of operating speed throughout said predetermined angle of rotation when the application of the control signal takes place within said predetermined time interval.

2. A paper feeding apparatus as recited in claim 1, wherein said drive motor is a stepper motor and said control signal consists of a plurality of control pulses for exciting windings of respective poles of said stepper motor, the operating speed of said stepper motor being progressively increased by means of a progressive decrease in pulse spacing of said control pulses.

3. A paper feeding apparatus in a printer operated through a commanding device, comprising:

a platen on which a sheet of paper is placed for impression of characters along a line of printing parallel to said platen;

a drive mechanism operatively connected to said platen and including a stepper motor having a plurality of poles to rotate said platen for feeding said sheet of paper in a direction normal to said line of printing;

a drive circuit for energizing said stepper motor; and a control device responsive to a paper feed signal from said commanding device and applying a group of control pulses to said drive circuit in response to said paper feed signal, said group of control pulses exciting windings of the respective poles of said stepper motor and thereby effecting a paper feeding cycle each time said paper feed signal is received by said control device, said control device including control means for judging whether or not said paper feed signal is received within a predetermined time interval after termination of the last paper feeding cycle triggered by the last paper feed signal, said control means comprising means for causing said control pulses to have a pulse spacing progressively decreasing to a predetermined value when said paper feed signal is received after said predetermined time interval has lapsed, and said control means including means for adapting said control pulses to have a constant pulse spacing corresponding to said predetermined value of pulse spacing when said paper feed signal is received within said predetermined time interval, whereby the operating speed remains constant when said paper feed signal is presented within said predetermined time interval after termination of the previous paper feeding cycle.

4. A paper feeding apparatus as recited in claim 3, wherein said control device comprises a micro-processor.

5. A paper feeding apparatus as recited in claim 3, wherein said commanding device comprises a keyboard having a key generating said paper feed signal upon activation thereof.

* * * * *